United States Patent

[11] 3,533,445

| [72] | Inventor | Donald E. Kraft<br>928 Winona Blvd., Rochester, New York 14617 |
|---|---|---|
| [21] | Appl. No. | 367,294 |
| [22] | Filed | May 14, 1964 |
| [45] | Patented | Oct. 13, 1970 |

[54] MULTIPLE PASSAGE SPOOL VALVE HAVING STEPPED BORE
3 Claims, 8 Drawing Figs.

[52] U.S. Cl. ..................................................... 137/625.18
[51] Int. Cl. ...................................................... F16k 11/00,
F16k 3/26
[50] Field of Search ............................................ 137/625.18,
614.17, 614.18, 625.68, 625.69, 625.35, 625.36,
625.38, 594, 625.48, 625.3; 251/318, 324, 325, 62

[56] References Cited
UNITED STATES PATENTS
2,331,393  10/1943  Hall .............................. 137/614.17
2,940,465  6/1960  Frantz .......................... 251/325X
3,047,015  7/1962  Buck ............................ 251/122X
3,266,521  8/1966  Blinkel et al. ................. 137/625.69X FOREIGN PATENTS
1,298,502  6/1962  France ......................... 137/625.68

Primary Examiner—William R. Cline
Attorney—Hoffman Stone

ABSTRACT: A valve of the spool type, and a fluid flow system controlled by one or more of the valves. The valve is intended primarily for use with dental equipment and includes a spool having intersecting radial and axial passages, with a conical throttle member within the axial passage for controlling the rate of fluid flow into the axial passage from the radial passage. The valve body includes passages bypassing the bore in which the spool is seated so that the valves may be arranged in banks without the need for separate connections to fluid containers.

Patented Oct. 13, 1970

↑ WORKING FLUID

INVENTOR.
DONALD E. KRAFT

BY

ATTORNEY

INVENTOR.
DONALD E. KRAFT
BY
ATTORNEY

INVENTOR.
DONALD E. KRAFT
BY
ATTORNEY

3,533,445

MULTIPLE PASSAGE SPOOL VALVE HAVING STEPPED BORE

BRIEF SUMMARY

This invention relates to novel dental apparatus and to a novel valve of the spool type particularly suited for use in the apparatus.

Modern dental equipment, particularly of the type wherein the working tools are driven by air turbines presents a relatively difficult valving problem. As many as four different fluids must be supplied to the dental hand piece during operation. Heretofore, control of the various fluids has been accomplished by an array of separate, solenoid operated valves, and, especially where the dentist's pedestal is equipped with two, three, or four different hand pieces, the plumbing arrangements have been complex and bulky, and difficult to assemble and to service.

Accordingly, one important object of the invention is to provide a valve capable of simultaneously controlling any desired number of fluids in separate circuits, the valve including separate, externally adjustable throttle means for as many of the fluids as desired.

Other objects are: to provide a valve of this type including built-in manifolding connections, whereby any desired number of the valves may be connected to common sources of fluid supply without the need for external manifolding; to provide a valve of this type including O-ring seals between relatively movable parts therein, the parts being so arranged that the O-rings do not move over radially facing ports.

The invention also includes a novel liquid supply arrangement, whereby the supply liquids are contained in closed systems, and their flow is controlled by alternately pressurizing and venting the systems, thereby avoiding the need to provide separate flow control valves in each liquid line.

DETAILED DESCRIPTION

The foregoing and other objects and advantages of the invention will become apparent from the following detailed description of representative embodiments thereof, taken in conjunction with the drawings, wherein.

Briefly, the invention contemplates a spool valve including a body having a step-tapered bore and radial inlet ports in the bore. A step-tapered spool fits slidably within the bore and includes separate, axially extending ducts, one for each fluid to be controlled by the valve. Radial ducts provide communication between the respective axial ducts and the outer surface of the spool. Externally accessible needle valves are fitted in the respective axial ducts for controlling the rate of fluid flow through them. The outlets of the valve to the utilization devices are axially through one end of the spool, or on a portion of the spool surface that extends out of the bore. Additional, nonvalved outlets are provided in the body for manifolding purposes so that each supply fluid may flow substantially unimpeded through the valve. A plurality of the valves may thus be arranged in an array with their corresponding fluid circuits in parallel with respect to the fluid sources.

The valve makes use of O-rings for sealing between the spool and the body. The bore of the valve body is step-tapered so that the O-rings, which in the illustrated embodiments are carried in grooves on the spool, do not pass over the radially facing ports in the bore, but instead engage only smooth, unbroken cylindrical wall portions of the bore and axially facing annular shoulders therein. Because of the double curvature of the ports it is extremely difficult to smooth their edges so that they will not unduly abrade an O-ring rubbing over them. On the other hand, it is a relatively simple matter to provide a smooth finish on an axially facing shoulder. In the practice of the invention, contact by the O-rings against the radially facing ports is avoided by the relatively simple expedient of tapering the bore. The bore is readily machinable by simple drilling and broaching methods. No radially facing grooves are required in it, a feature that materially reduces its cost relative to other spool valves which require grooves to be milled within the bore of the body.

Another feature of the invention pertains to the control of the supply liquids. Only the air supply is valved. The liquids are contained in separate, closed systems, which are alternately pressurized and vented according to demand, thus reducing the number of valves in the overall system.

Figure 1:
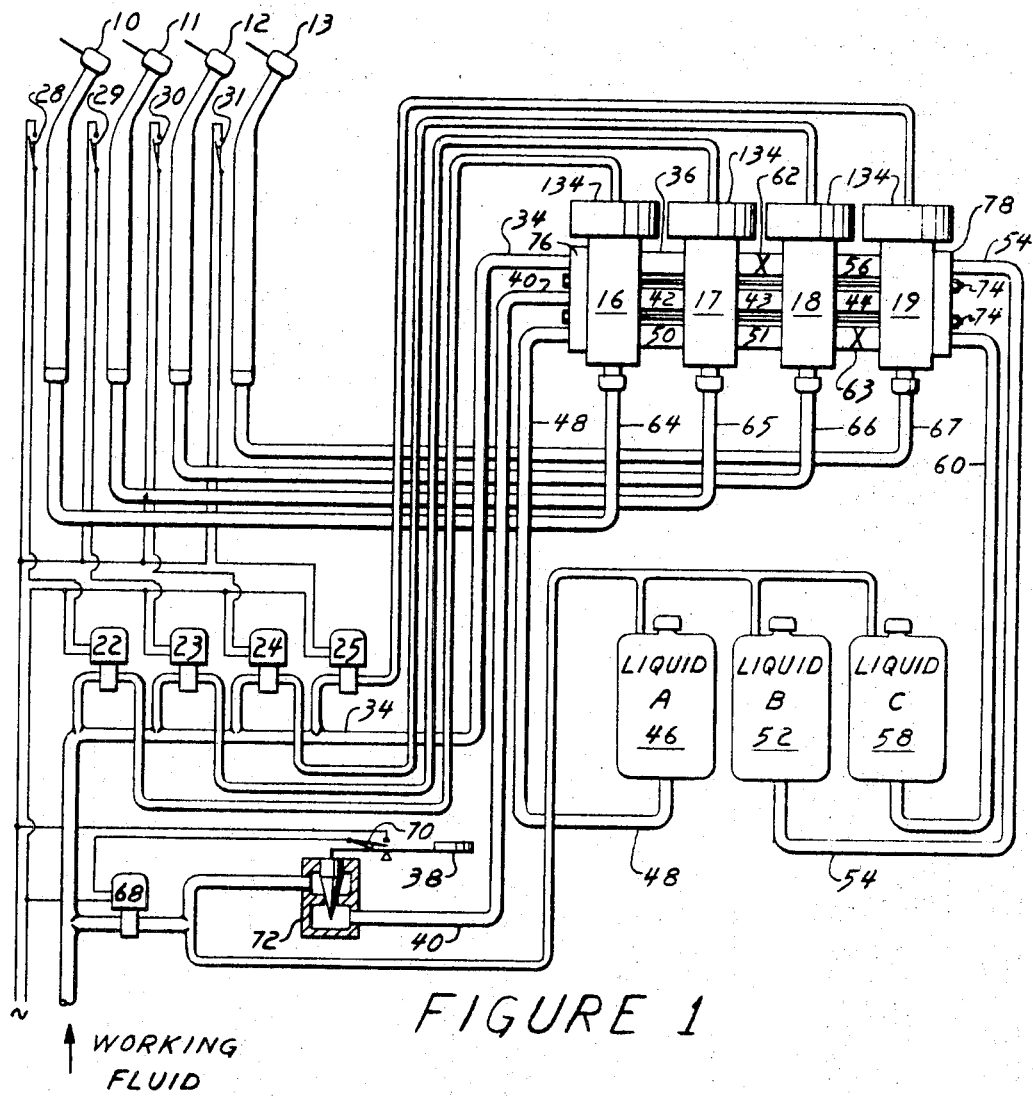
FIG. 1 is a partly schematic diagram of a dental system according to the present invention including four hand pieces of the air turbine type and four spool valves of the invention.
Figure 2:
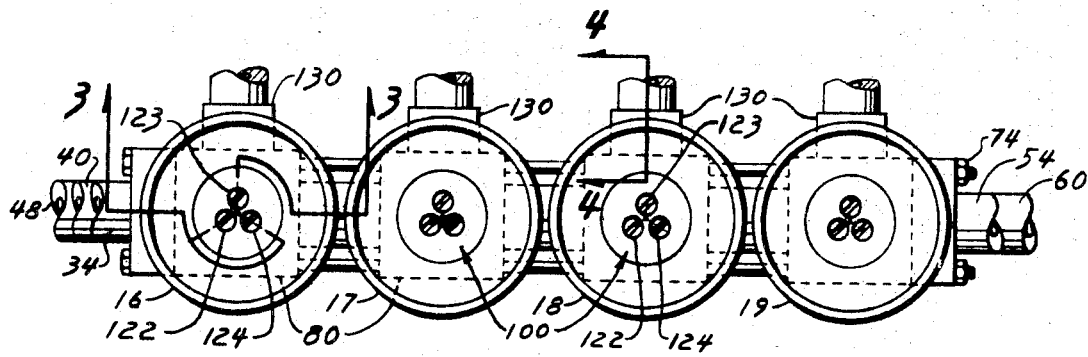
FIG. 2 is a plan view of the array of the four valves of the invention as arranged in FIG. 1.

Referring now to the drawings, FIG. 1 is a schematic diagram of a dental equipment system including four hand pieces 10, 11, 12, and 13, respectively, and four selector spool valves 16, 17, 18, and 19, respectively, of the invention, each one of the spool valves being associated with a different respective one of the hand pieces. The valves 16—19 are actuated by a pressure fluid such as compressed air in response to actuation of solenoid valves 22, 23, 24, and 25, respectively, which are connected between the source (not separately designated) of the pressure fluid and the respective valves 16—19. The solenoid valves 22—25, in turn, are actuated in response to the closing of separate, normally closed limit switches 28, 29, 30, and 31, respectively, which are individually held open by the respective hand pieces 10—13 when the hand pieces are in their receptacles on the pedestal (not shown). When the dentist selects a particular hand piece and removes it from its receptacle, the corresponding limit switch 28, 29, 30, or 31 closes, the corresponding solenoid valve 22, 23, 24, or 25 is actuated to admit pressure fluid to the actuating cylinder 134 of the corresponding selector valve 16, 17, 18 or 19, and the selector valve is thereby actuated to its open position.

The controlled fluids in the system as illustrated are five in number:

First, pressure air for air bearings in the turbines of the first two hand pieces 10 and 11 is delivered directly from the source to the first selector valve 16 through a conduit 34, and, through the body of the valve 16 and a nipple 36, to the second valve 17. This air supply is not valved responsively to operation of the dentist's foot pedal 38, but is always available in the two valve bodies 16 and 17, because it is desired to maintain the flow of air for bearing purposes at all times when either hand piece 10 or 11 is out of its holder in order to keep the bearing operative while the turbine is decelerating.

Second, air for driving the turbines in the hand pieces 10 —13 is delivered to all of the valves 16—19 through a conduit 40, the air being bypassed around the valve spools in each of the first three valves 16, 17, and 18, and passing through the nipples 42, 43, and 44.

Third, a first liquid, which may be, for example, plain water, is delivered to the first three spool valves 16, 17, and 18 from a first pressure container 46 through a conduit 48, the liquid passing through the body of the first valve 16 and the connector nipple 50 to the second valve 17, and through the body of the second valve and a connector nipple 51 to the third valve 18.

Fourth, a second liquid, which may be, for example, lubricating oil for the oil bearings in the turbines of the second two hand pieces 12 and 13, is delivered to the second two spool valves 18 and 19 through a conduit 54 from a second pressure vessel 52, the liquid passing through the body of the last spool valve 19 and a connector nipple 56 to the third valve 18.

Fifth, a third liquid, which may, for example, be a solution of a detergent in water, is delivered from a third pressure vessel 58 through a conduit 60 to the last spool valve 19 only.

As will be described in greater detail hereinafter in connection with the description of the internal structure of the spool valves 16—19, the controlled fluids are free to pass in a horizontal direction through the body of each valve substantially without obstruction. Closure elements as indicated by the crosses 62 and 63 are provided between the respective valves when it is desired to seal off their corresponding inlet ports one from the other. The controlled outlets of the spool valves 16—19 lead into individual multi-passage hoses 64, 65, 66, and 67, respectively, which lead from the respective valves 16—19 to the respective hand pieces 10—13.

The pressure tanks 46, 52, and 58 are connected to the pressure fluid source through a three-way solenoid valve 68, which alternately connects the pressure tanks 46, 52, and 58 to the pressure fluid and to the atmosphere in response to the opening and closing of the pedal-operated switch 70. The pressure air for driving the turbines in the hand pieces 10—13 enters the conduit 40 after passing through the three-way valve 68 and the pedal-actuated throttle valve 72.

In operation, after removing one of the hand pieces 10—13, there is usually an interim waiting period during which the dentist prepares to use the hand piece. During this period, before the dentist depresses his foot pedal control 38, the three-way solenoid valve 68 remains closed, and working air is delivered only to the conduit 34 for maintaining the air bearings and to the actuating cylinder of the valve associated with the selected hand piece. None of the liquids flow, because all of the pressure tanks 46, 52, and 58 are vented to atmosphere through the valve 68.

When the dentist actuates the control pedal 38, the switch 70 closes to actuate the three-way solenoid valve 68, which thereupon admits pressure air to the throttle valve 72 and to the three pressure tanks 46, 52, and 58. Air for driving the turbine in the hand piece flows through the throttle valve 72, the conduit 40 and the open one of the spool valves 16—19 to the hand piece 10—13.

When he is through using the hand piece, the dentist releases the pedal 38, thereby opening the switch 70 and deactuating the three-way solenoid valve 68, which thereupon vents the pressure tanks 46, 52, and 58 to atmosphere to stop the liquid flow, and also closes off the turbine drive air supply. When the dentist returns the hand piece to its holder, the hand piece limit switch 28, 29, 30 or 31 opens to deactuate the actuator solenoid valve 22, 23, 24, or 25, and thereby to deactuate the corresponding spool valve 16, 17, 18, or 19.

The assembly of spool valves 16—19 is secured together in the embodiment shown by two tie bars 74, which pass through horizontal holes in the bodies of the respective valves, and maintain sealing pressure between the valve bodies and the respective nipples and stoppers 36, 42, 43, 44, 50, 51, 56, and 62, and between the connector end plates 76 and 78 and the first and last valves 16 and 19, respectively. If desired, however, the assembly may be secured by soldered fittings between the various parts or by any other desired means.

Figures 3, 4:
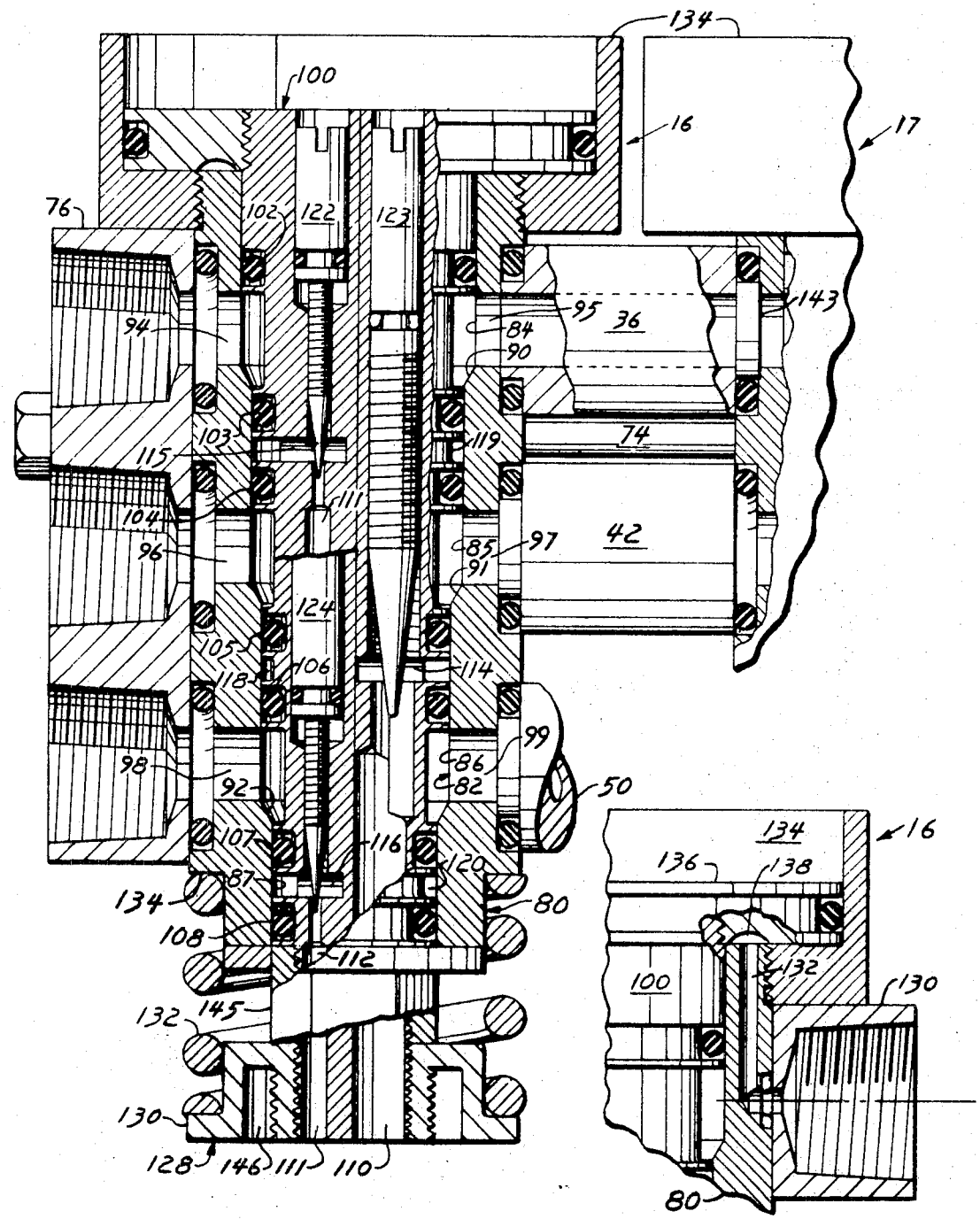
FIG. 3 is a longitudinal sectional view on an enlarged scale taken along the line 3–3 of FIG. 2 showing one of the spool valves in its closed position, portions of the section being broken away in order to show all three of the controlled fluid circuits.
FIG. 4 is a fragmentary longitudinal sectional view taken along the line 4–4 of FIG. 2.

FIG. 3 shows a cross section of the first one 16 of the valves, all of the valves 16—19 being identical, except that the end ones 16 and 19 are provided with connector plates 76 and 78, while the intermediate ones are fitted with the connector nipples. The valve 16 includes a body 80 of square cross section and having a step-tapered bore 82. The bore 82 is divided into four sections 84, 85, 86, and 87 by three annular, inclined shoulders 90, 91, and 92, respectively. The sections 84, 85, 86, and 87 of the bore are of successively smaller diameters. Two diametrically opposed ports 94 and 95, respectively, extend through the body wall and open into the uppermost and largest section 84 of the bore. Similarly, two ports 96 and 97 extend through the body wall and open into the second section 85 of the bore. And lastly, a third pair of diametrally opposed ports 98 and 99 extend through the wall of the body 80 and open into the third section 86 of the bore.

A spool 100, shown in its closed position in FIG. 3, fits slidably within the bore 82 of the body. The spool 100 does not close off or substantially effect communication between any pair of the ports 94—99 that open into a common section of the bore 82. For example, a fluid entering into the valve body through the port 94 is free to circulate around the spool 100 and exit through the port 95 regardless of the position of the spool at any given moment.

Resilient, compressible O-rings 102, 103, 104, 105, 106, 107, and 108, carried by the spool 100 and fitted in grooves (not separately designated) therein, engage the walls of the bore 82 and constitute the valve seals. The use of O-rings allows greater tolerances in manufacture as compared to spool valves having metal lands. At the top of the spool 100, the first O-ring 102 seals against the wall of the top portion section 84 of the bore for all positions of the valve, and is always above the two ports 94 and 95 which open into the top section 84. The O-ring 102 rubs and rolls only against the smooth, unbroken part of the bore section 84. Similarly, the third O-ring 104, the fifth O-ring 106, and the seventh O-ring 108 always remain in sealing engagement with the smooth, unbroken parts of, respectively, the second section 85, the third section 86, and the fourth section 87 of the bore. The second O-ring 103, the fourth O-ring 105, and the sixth O-ring 107 ride, during motion of the valve, over the respective annular shoulders 90, 91, and 92, which separate the different bore sections. When the spool 100 moves upwardly to its full open position, these O-rings 103, 105, and 107 move into the respective next larger sections 84, 85, and 86 of the bore, and stand clear of the bore as shown for the second O-ring 103 in FIG. 5.

The spool 100 as shown has three separate axial passageways 110, 111, and 112, extending the entire length of the spool and opening at both ends thereof, and three axially spaced radial passageways 114, 115, and 116, which respectively intersect the three axial passageways 110, 111, and 112. The first radial passageway 114 opens exteriorly of the spool in an annular groove 118 about midway along the length of the spool between the fourth and fifth O-rings 105 and 106. The second radial passageway 115 opens exteriorly of the spool within an annular groove 119 between the second and third O-rings 103 and 104. Similarly, the third radial passageway 116 opens in an annular groove 120 located between the last two O-rings 107 and 108. Portions (not separately designated) of the axial passageways are threaded to receive adjustable needle valves 122, 123, and 124, respectively, the needle portions of which extend adjustably across the radial passageways. When the needle valves 122, 123, and 124 are driven downwardly, they close communication between the radial passageways 114, 115, and 116 and the lower parts of the respective axial passageways 110, 111, and 112.

The spool 100 extends beyond the lower end of the body 80, and an annular adapter 128 is fixed to the lower end of the spool 100. The adapter 128 includes an outwardly extending flange 130, and a compression coil spring 132 is fitted between a a flange 134 at the bottom of the body and the flange 130 of the adapter for biasing the spool toward its downward limit position in the body 80, and for returning the spool to its closed position when the valve is deactuated.

The valve is actuated to its open position by pressure air, which enters through an inlet fitting 130 (FIG. 4) angularly spaced from the regular ports 94—99 of the body. The air then passes through an axial passageway 132 in the body 80, and upwardly into a cup-shaped member 134 which is fixed and sealed to the body 80 at the upper end thereof. The pressure air then raises the piston 136, which is slidable within the member 134, and which is secured to the upper end of the spool 100. The upward travel of the spool 100 in the body 80 is limited by the abutment of the adapter 128 against the lower end of the body 80. The annular groove 138 on the bottom face of the piston is provided in order to insure distribution of the pressure air fully around the piston at the beginning of the actuating stroke.

Figure 5:
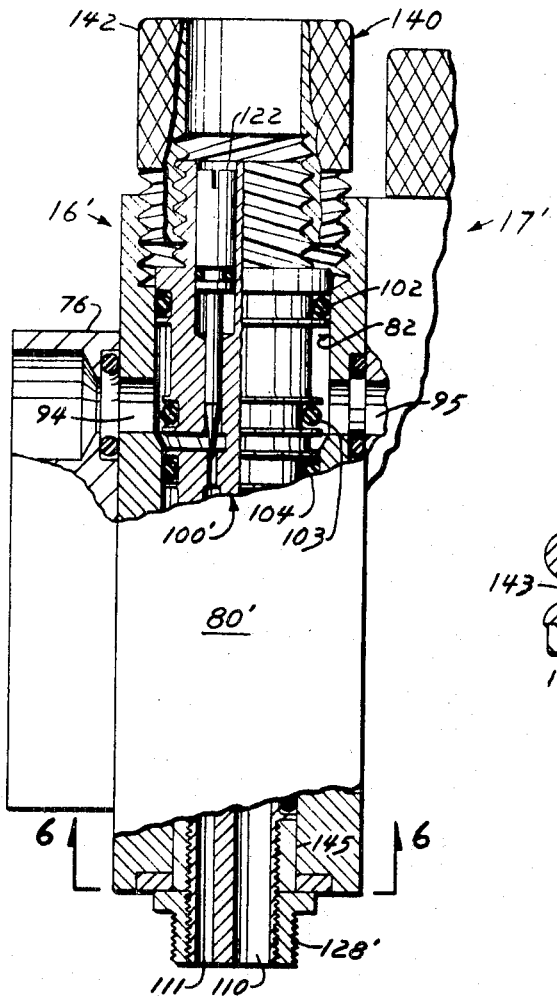
FIG. 5 is a side elevational view, partly in section of a spool valve according to a modified form of the invention, the valve being operatable manually instead of pneumatically, and showing the valve in its open position.

When the spool is actuated to its upper, or open position, as shown in the manually actuated embodiment illustrated in FIG. 5, the grooves 118, 119, and 120 are brought into the respective bore sections immediately above the sections where they lie in the closed position, thus permitting the respective fluids to pass into the radial passageways 114, 115, and 116, through the needle valves and the respective axial passageways and out the lower end of the spool. When the spool is in its closed position, as seen in FIG. 3, the grooves 118, 119, and 120 are sealed off by their respective pairs of O-rings from communication with the ports 94—99.

As illustrated in FIG. 5, a quick-acting left and right-hand thread arrangement 140 may be used for raising and lowering the spool in the valve body by manual actuation of a knurled nut 142, in place of the pneumatic actuator hereinabove described.

The manually operatable valve 16' illustrated in FIG. 5 is more compact than the fluid actuatable valves 16—19 in that the actuating screw mechanism 140 is of smaller diameter than the width of the valve body 80', and does not extend radially outwardly beyond the side walls of the body as do the actuating cylinders 134 of the fluid actuatable valves 16—19. Connecting nipples, therefore, are not required for connecting the manually actuatable valves in parallel flow arrangement. The manual valves 16' may be so connected merely by securing them directly together as shown in FIG. 5.

When it is desired to block off one of the fluid circuits between any two valves of an array, flow blocking means such as the disc 143 (FIG. 3) may be placed within the O-ring in the port at the outer surface of the valve body 80 at the desired point in the circuit. By this means, each of the fluid circuits in an array of the valves may be divided into two parts, one part receiving one fluid from one end of the array, and the other part receiving a different fluid from the opposite end.

In the manually actuatable valve 16' shown in FIG. 5, it is necessary to key the spool 100' against rotation relative to the body 80' in order to hold the spool against rotation during operation of the screw type actuating device 140. It is also preferred to key the spool 100 of the pneumatically actuatable version against rotation relative to its body 80 in order to maintain the angular alignment of the needle valves relative to the body 80.

Figure 6:
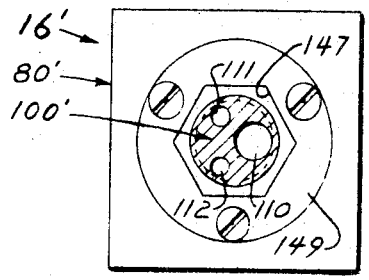
FIG. 6 is a cross-sectional view taken along the line 6–6 of FIG. 5.

As shown in FIGS. 3, 5, and 6, the spools 100 and 100' are keyed to their respective bodies 80 and 80' by an internally threaded hexagonal sleeve 145, which is threaded onto the lower end of the spool 100 or 100' and locked thereon by the adapter 128 or 128'. The sleeve 145 fits slidably within an hexagonal aperture 147 in a disc 149, which is fixed to the bottom of the body 80 or 80'.

Figure 7:
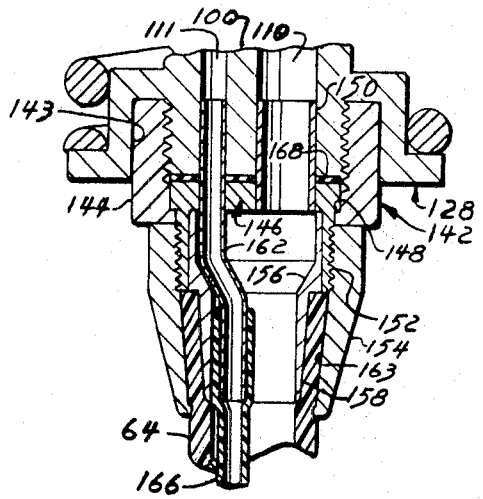
FIG. 7 is a fragmentary, longitudinal sectional view of a hose coupling device according to the invention, attached to the discharge end of the spool valve.

FIG. 7 illustrates a connector according to the invention for effecting a connection between the multipassage delivery hose 64, 65, 66, or 67 and the outlet of one of the valves 16—19. The connector includes four major parts, plus individual short lengths of tubing which connect between the minor, or smaller orifices 111 and 112 of the valve spool and the smaller hose passageways. First, there is a nut 144 which fits within a groove 143 on the adapter 128 of the valve and threaded engages the adapter. Second, there is a disc 146 which fits within the nut 144 and rests against an inwardly extending annular flange 148 therein. The disc 146 carries a first tube 150, which fits within the largest passageway 110 in the valve spool, and separate reversely bent tubes 162 (only one of which is shown) which fit loosely into the smaller outlet passages 111 and 112, respectively, and extend downwardly from the disc. The tubes 150 and 162 are sealed, as, for example, by soldering to the disc 146. The disc 146 also includes an annular flange 152, which extends downwardly beyond the lower end of the nut 144, and which is externally threaded to receive a clamping nut 154.

An annular insert 156 rests in endwise abutment against the bottom surface of the disc 146, and within the flange 152. The lower end portion 158 of the insert is downwardly tapered to fit into and slightly dilate the hose 64.

The inner surface 163 of the lower end of the clamping nut is also tapered at about the same angle as the taper of the insert 156. The hose 64 is thus firmly clamped between the insert 15 and the nut 154. The use of the insert 156 enables the use of a hose 64 of a smaller diameter than would be required to match the diameter of the outlet end of the spool 100. It also enables the provision of a relatively large space within the flange 152 of the disc to facilitate attachment of the connector to the spool.

Before the clamping nut 154 is threaded upon the flange 152, the reversely bent tubes 162 are inserted into the small diameter inner tubes 166 in the hose.

A flat gasket 168 provides a seal between the outlet end of the spool 100 and the upper surface of the disc 146.

It has heretofore been the general practice to feed a mist of lubricating oil into the turbine drive air stream at a point close to the end of the conduit where the turbine drive air enters it. This has led to certain difficulties, primarily due to the tendency of the oil to condense in the air line, and, as a result, to flow irregularly into the hand piece, at times flooding the turbine.

Figure 8:
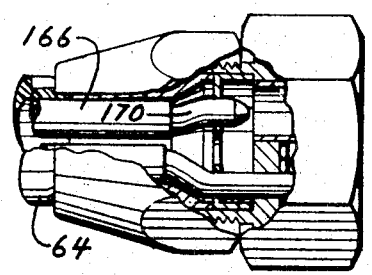
FIG. 8 is a side elevational view, partly in section showing a hose coupling device according to the invention for attachment to one of the dental hand pieces.

This difficulty is overcome in the practice of the present invention by the provision of a separate passageway 168 for the lubricating oil, leading from the valve, to the hand piece, and terminating at the hand piece in a vaporizing nozzle 170 as shown in FIG. 8. The venturi effect of the turbine drive air passing by the nozzle assists in dispersing the oil into a fine mist just as it enters the hand piece, a point close enough to the turbine that the oil does not condense before reaching it. The turbine always has a steady supply of lubricating oil at the proper rate.

I claim:

1. A valve of the spool type comprising:
    a. a body having a bore therein, said bore having two coaxial portions of different respective diameters and an annular shoulder separating said two portions;
    b. said body having a passage opening radially into the larger portion of said bore adjacent to said annular shoulder;
    c. a spool slidable axially within said bore between two limit positions therein;
    d. annular sealing means carried by said spool for sealing against said bore portions, a first one of said sealing means being positioned on said spool to remain in sealing engagement with the smaller one of said bore portions for all positions of the valve, a second one of said sealing means being positioned on said spool to remain in sealing engagement with the larger one of said bore portions on the opposite side of said passage from said shoulder for all positions of the valve, and a third one of said sealing means being axially spaced between said first and second sealing means and positioned on said spool to pass across said shoulder during motion of said valve, said spool having a passageway opening radially between said first and said third sealing means and axially of said spool, whereby displacement of said spool between said limit positions alternately opens and shuts off fluid flow between said passage in said body and said passageway in said spool.

2. A multi-valve of the spool type comprising:
    a. a body having a central bore, said bore having three portions of successively smaller diameters, and inclined annular shoulders axially spacing said bore portions apart;
    b. radial passageways extending through the wall of said body and opening one in each of the two larger ones of said bore portions;
    c. a spool axially movable within said bore between two predetermined limit positions;
    d. a first pair of axially spaced sealing means on said spool for sealing against the intermediate one of said bore portions between the radial passageway opening therein and the largest bore portion when said spool is at its first limit positions, said sealing means being positioned so that when said spool moves toward its other limit position one of said sealing means is carried into the largest bore portion while the other one of said sealing means remains in sealing engagement with said intermediate bore portion;

e. said spool having a first annular groove between said sealing means, a first radial passageway opening in said groove, and a first axial passageway opening both at one end of said spool and into said radial passageway;

f. a second pair of axially spaced sealing means on said spool for sealing against the smallest one of said bore portions when said spool is at its first limit position, said second sealing means being positioned so that when said spool moves toward its other limit position one of said second sealing means is carried into the intermediate one of said bore portions while the other one of said second sealing means remains in sealing engagement with said smallest bore portion; and g. said spool having a second annular groove between said second sealing means, a second radial passageway opening in said second groove, and a second axial passageway opening both at one end of said spool and into said second radial passageway.

3. A valve of the spool type comprising:

a. a body having a bore therein, said bore having two coaxial portions of different respective diameters and an annular shoulder separating said two portions;

b. said body having a passage opening radially into the larger portion of said bore adjacent to said annular shoulder;

c. a spool slidable axially within said bore, between two limit positions therein;

d. resilient O-rings encircling said spool for establishing seals between said spool and said body;

e. a first one of said O-rings being positioned on said spool to remain within the smaller one of said bore portions for all positions of said valve;

f. a second one of said O-rings being positioned on said spool to remain within the larger one of said bore portions on the opposite side of said passage from said shoulder for all positions of said valve;

g. a third one of said O-rings being axially spaced between said first and second ones and positioned to pass over said shoulder during motion of said valve, sealing against the smaller bore portion in one limit position and being radially inwardly spaced from the larger bore portion in the other limit position; and h. said spool having an outlet passage opening at one end between said first and said third O-rings, and extending along said spool to a discharge opening.